Oct. 18, 1966         C. N. SCHRADER, JR         3,278,997
      METHOD AND APPARATUS FOR MAKING A ONE-PIECE
          CORE FOR CASTING BLADED WHEELS
Filed Oct. 26, 1964                    2 Sheets-Sheet 2
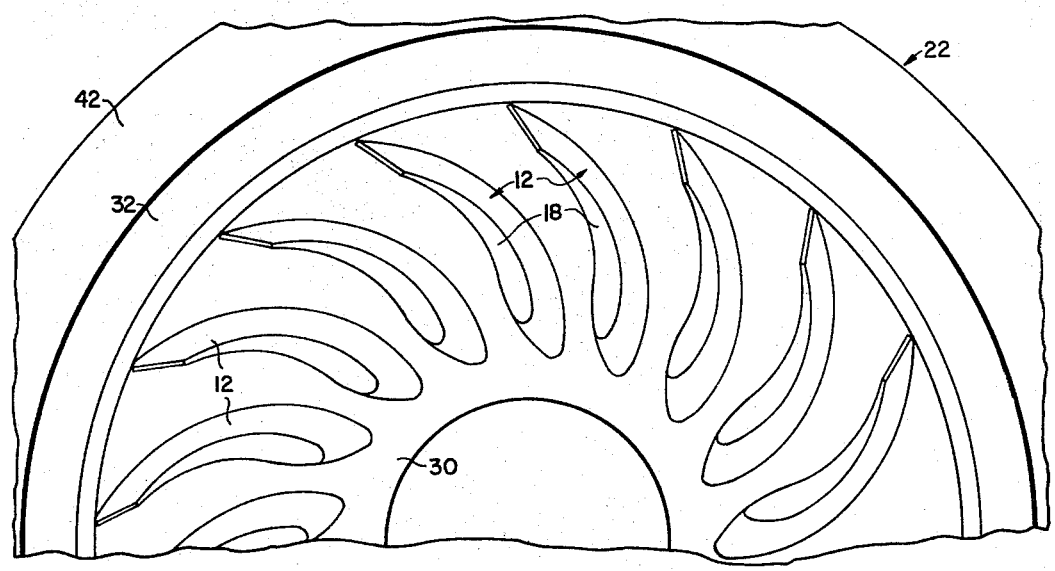
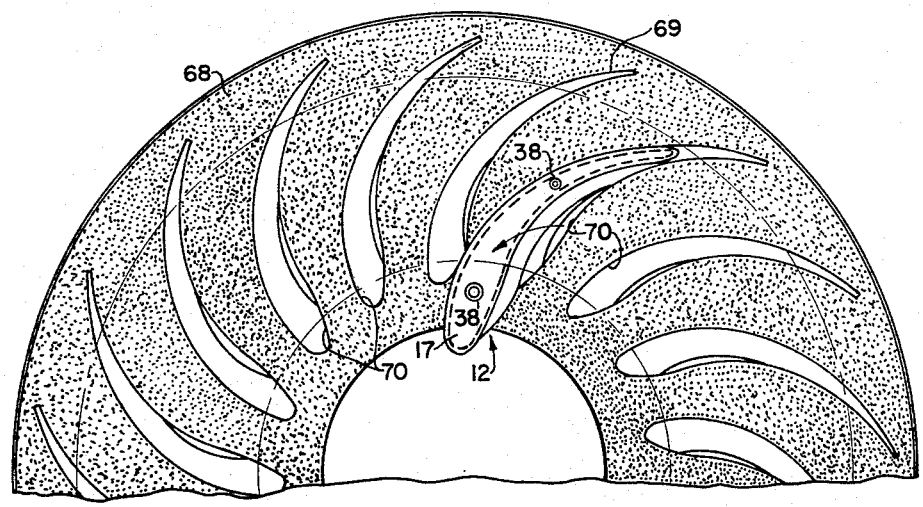
INVENTOR.
CARL N. SCHRADER, JR.
BY
*Strauch, Nolan & Neale*
ATTORNEYS

United States Patent Office 3,278,997
Patented Oct. 18, 1966

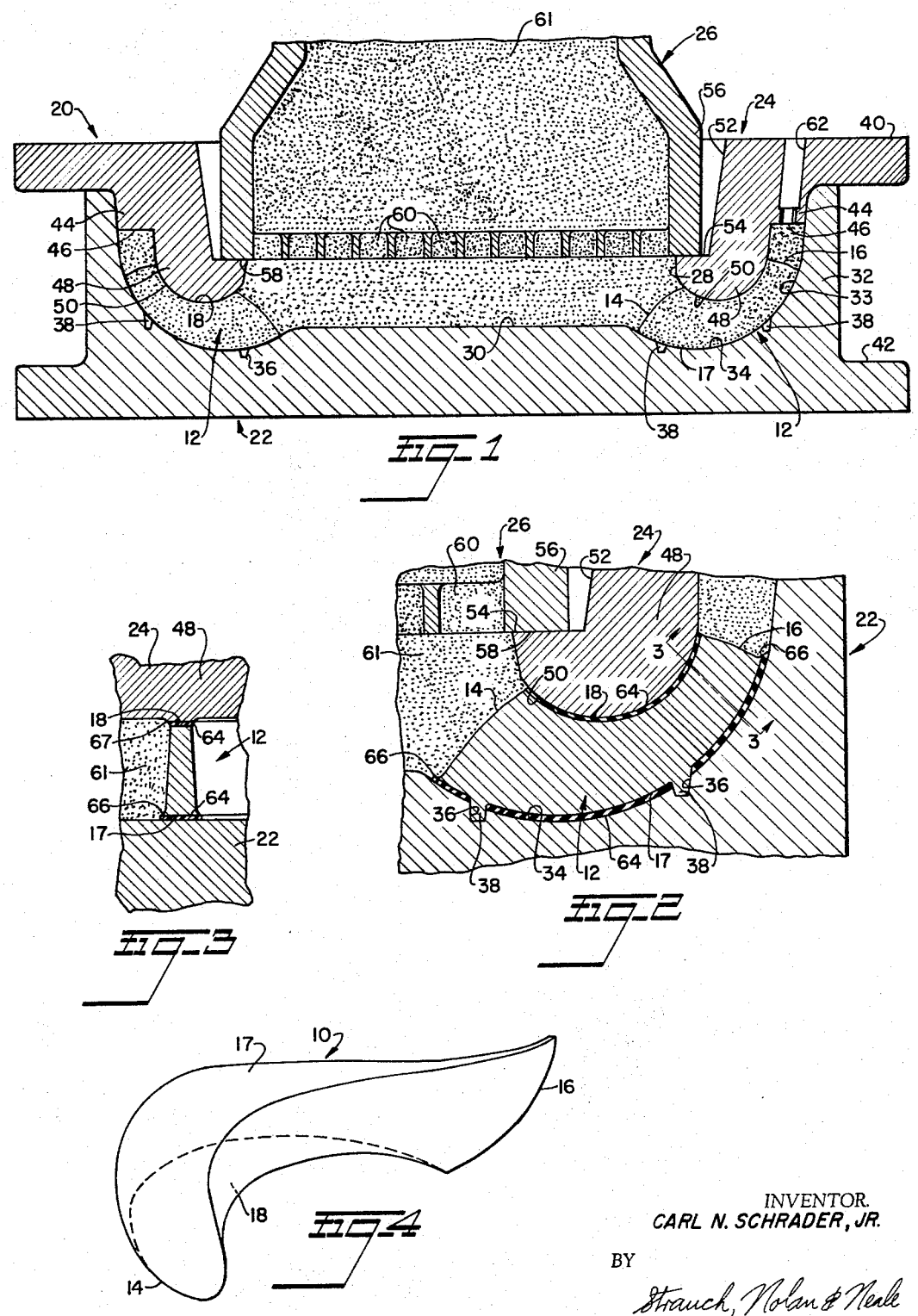

3,278,997
METHOD AND APPARATUS FOR MAKING A ONE-PIECE CORE FOR CASTING BLADED WHEELS
Carl N. Schrader, Jr., Trenton, Mich., assignor to Rockwell-Standard Corporation, Pittsburgh, Pa., a corporation of Delaware
Filed Oct. 26, 1964, Ser. No. 406,404
13 Claims. (Cl. 22—13)

This invention refers to methods and apparatus of making cores for casting bladed wheels, and more particularly to methods and apparatus for making a one-piece core for casting bladed wheels such as used in turbines, torque-converters and the like.

Prior methods of producing a core with intricate blade openings for casting a bladed wheel consisted mainly of making several individual core segments which were assembled as by gluing to form the core. This method is time consuming, tedious, unsatisfactory and uneconomical because of the complex structure of the core box necessitated by the separate segments. Also bladed wheels cast with a segmented core have surface burrs or flash produced by metal flowing into the partitions between the segments and this flash has to be removed by grinding and polishing, further adding to costs.

The difficulties encountered in making a suitable core in one piece are mainly due to the intricate contour of the blade patterns, the locating of the blade patterns in the core box and the subsequent removal of the patterns from the finished core.

Suggested prior methods of removing the blade patterns from the finished core included drawing the curved blade patterns out in a twist motion or straight draw motion. However, these prior conventional methods could only be accomplished by extreme blading changes affecting the entrance and exit angles of the cast blades critical to the function of the hydrodynamic device. Thus, bladed wheels produced by these methods were suitable only for low torque multiplications and, therefore, unsatisfactory to a large degree for automotive applications.

Other known prior methods and apparatus involved in making a one-piece blade core are the "Lost Wax" process and the use of rubber blade patterns. Of these the "Lost Wax" process is the most efficient and accurate and produces cores containing any desired blade configuration. This process is extremely expensive since the blade pattern can only be used once and in order to make a large number of molds for any blade configuration, a similar number of "Lost Wax" blade patterns must be made, which in itself, due to the required accuracy of the patterns, is an expensive and time consuming process. For the above reasons, although highly accurate, the "Lost Wax" process has not found acceptance in mass production of bladed wheels.

The other process involving resilient rubber blade patterns, which are easily extracted from the finished core no matter how intricate the blade shape, has inherent disadvantages in that when the core material settles, the thin tail sections of the blade patterns move due to the flexibility of the rubber, thereby undesirably changing the designed exit angles of the cast blades.

Another undesirable factor connected with prior methods is that, during blowing of the sand into the core box, the corners between the lower edges of the blade patterns and the inner core box surface are not always completely filled due to the sharpness of the corners which, when casting the complete wheel with this core insert, results in voids along the edges of the blade patterns between the blade patterns and the shroud members that, when not repaired by filling the voids, causes weak sections in the core material resulting in an undesirable casting outline which has to be removed and blended with the casting outline.

In this connection, another serious defect has been discovered. It was noted that during blowing of the core material into the core box the sand pushes the air under the blade patterns and into the adjoining passage, causing air pockets to form between the blade pattern and the core box and immediately adjacent the blade pattern edges, creating surface voids which have to be patched or filled. This porous core produces a rough surface in the casting, making filing of the cast blades necessary to obtain a smooth surface on the finished wheel, which is imperative for accurate fluid flow. Thus, it is important to provide a core as dense as possible and to prevent any air pockets in the core being formed in order to have a near perfect casting with smooth surfaces at all points and to avoid a subsequent filing and polishing of the bladed wheels in the intricate passages.

It has been proposed as in United States Letters Patent No. 2,887,744 to Halliday and No. 3,012,295 to Lapsley provide special separable pattern structure for making one-piece mold cores for casting bladed wheels. However in such pattern structures as Halliday a special internal guide structure is required whereby the blade patterns may be extracted prior to hardening the core, and Lapsley is representative of multipart pattern structures. The invention distinguishes over these patented arrangements in that it does not require a special guide member as in Halliday, and its pattern structure has fewer parts arranged in improved assembly as compared to Lapsley. The invention also includes other novel refinements such as sealing of the blade patterns and special edge forming arrangements not suggested in the art.

The present invention provides means by which the foregoing shortcomings of the prior art are eliminated and the invention is primarily applicable in connection with solid cast blades of the Schneider type, such as for instance, disclosed in U.S. Patent No. 2,410,185. Wheels incorporating these type blades were extremely difficult to cast in one piece due to the complex shape of the blades resembling a fish in motion. The crossection of these blades changes continuously, not only along its length but also along its axis, providing a relatively thick "fish head" entrance portion and a thin, sleek "fish tail" exit portion. Because of this streamlined curvilinear configuration of the blades, they are best suitable for high torque multiplication.

The major object of the invention is to provide novel method and apparatus for making a one-piece core for casting bladed wheels.

The present invention, therefore, provides in connection with the making of a bladed wheel employing blades of the Schneider type, a one-piece core having hollows in exact conformity with the intricate streamline configuration of the blades.

Another object of the present invention is to provide a one-piece core for casting bladed wheels by inserting a number of separate rigid blade patterns in a core box and properly locating and holding them, blowing sand or plaster into the core box around and between the blades, solidifying the core as by baking and thereafter removing the blade patterns from the side of the cores.

Still another object of the present invention is to provide a novel core box and blade pattern assembly in which the surface areas of the core box contacted by the rigid blade patterns are hermetically sealed by coating them or the respective surfaces of the blade patterns with a fast curing sealing compound such as the rubberlike silicone known as "Silastic" manufactured by the Dow Corning Corporation, to prevent sand or plaster from being blown between the blades and core box surface.

A further object of the present invention resides in the provision of accurate blade patterns made of steel, aluminum, rigid polyurethane or like material which are provided with outwardly extended circumferential base areas having a smooth radius towards the fluid flow surfaces to produce a core having fillet areas around the inner and outer edges of the blades to eliminate the sharp corners between the blade edges and shroud sections to prevent the formation of voids or air pockets adjacent the blade patterns edges during core blowing or casting.

A still further object of the present invention is the provision of accurate die-cast hard coat aluminum or investment cast blade patterns of the Schneider type blades for use in making a one-piece core which will produce an accurate cast bladed wheel, the blade patterns when removed from the core being able to produce other cores of consistent accuracy and duplication.

Further objects and novel features will become apparent or specifically be pointed out in the following detailed description in connection with the appended drawings which show a preferred form of embodiment and in which:

FIGURE 1 is a section in side elevation through a core box and part of a blower head according to a preferred embodiment of the invention;

FIGURE 2 is a fragmentary enlarged section through one of the blade patterns in the core box;

FIGURE 3 is a section through the blade pattern within the core box along line 3—3 of FIGURE 2;

FIGURE 4 illustrates one form of complex blade pattern structure which can be used in the present invention;

FIGURE 5 is half of a top plan view of the lower part of the core box of FIGURE 1 showing the blade patterns positioned therein; and FIGURE 6 illustrates half of the finished core when removed from the box and the mode of extracting the blade patterns from the core.

The one-piece core of the present invention is used to cast bladed wheels such as may be used in hydrodynamic fluid transmissions and may involve either a pump or turbine wheel. The blades in such wheels have to be of such configuration as to provide a smooth fluid flow within the torus chamber without turbulence and must be smooth and free of surface imperfections. To accomplish a smooth fluid flow which will produce a maximum desired torque multiplication, the blades of the present invention are of intricate parabolic shape providing the correct entrance and exit angles which are important to achieve highest efficiency. Such blades are as illustrated in FIGURES 4 and 5. The blade shape 10 in FIGURE 4 is a characteristic turbine blade and the blade shape 12 shown in FIGURES 5 and 6 is an impeller or pump blade. Both blades are of the Schneider type and their general configuration is that of a twisted body produced by twisting the outer edge 17 of the leading end 14 and trailing end 16 in opposite direction while holding the inner edge 18 of the blade fixed. The body of the blade diminishes in thickness from the leading end 14 towards the trailing end 16 and concurrently from the outer edge 17 towards the inner edge 18, thus producing a streamline shape which is most effective in directing fluid flow. The entrance and exit angles of the blades 10 and 12, formed by the twisted leading end 14 and trailing end 16, are of utmost importance in achieving maximum efficiency in the torque output of the assembled wheels equipped with these blades. Consequently, the making of a one-piece core which would accurately produce blades of such intricate shape when used in casting a bladed wheel met with various difficulties as mentioned before.

With reference to FIGURE 1, the core box assembly 20 used to make the core for a wheel casting according to the preferred embodiment of the invention is essentially composed of a bottom part 22, an upper part 24 and a blower head 26 which in the assembly rests upon upper part 24 and closes the large central aperture 28 during blowing and setting of the core.

Lower part 22 has a large upwardly open bowl-like cavity 30 surrounded by a substantially vertical side wall 32 having an inner surface 33 merging into a concave circular annular recess 34 extending around the outer edge of the bottom of the bowl cavity. Recess 34 is shaped and adapted to receive the matching convex outer edge 17 of the rigid accurately shaped blade patterns 10 or 12. In FIGURES 1–3 master blade 12 is shown, although the blade pattern 10 of FIGURE 4 may be used in a different shaped cavity. To receive and retain the blade patterns 12 in proper predetermined position, as illustrated in FIGURE 5, recess 34 may be provided with a number of properly spaced notches 36 and the master blades 12 formed with corresponding projections 38 extending from the convex outer edge 17 of the blade patterns to fit within notches 36 to properly arrange and space the blade patterns in a circular row around recess 34 as shown in FIGURE 5. Preferably the blade patterns are of exactly the same size and shape and equally spaced circumferentially.

After insertion of the blade patterns 12 into the lower core box part 22, the upper core box part 24, which is made of steel, aluminum, plastic or rubber type material, is placed on the lower part so that the radially outwardly extending flange 40 rests on top of side wall 32 and is held there under pressure by blow head 26.

The two parts 22 and 24 may be clamped together as by means connecting their radial outer flanges 40 and 42 respectively, in any suitable manner known in the art and need not further be described. Adjacent the flange 40, inwardly of the lower box part 22, upper part 24 is provided with a pilot section 44 which tightly fits within the lower part in smooth engagement with inner sidewall surface 33, thus preventing any core material from escaping therethrough. The lower horizontal surface 46 of pilot section 44 terminates above the trailing ends 16 of the blade patterns. Radially inwardly of surface 46 pilot section 44 is formed with a downwardly extending annular flange 48 whose lower surface 50 is convex shaped to fit smooth with the concave inner edge 18 of blade patterns 12 so that in the assembly the blade patterns 12 will all be securely clamped between ring 48 of the upper core box part and concave recess 34 of the lower core box part.

Upper core box part 24 adjacent ring flange 48 is centrally apertured at 28 to provide for the core material to be introduced therethrough, and the inner surface of ring flange 48 adjacent aperture 28 is recessed at 52 to provide an annular horizontal ledge 54 for seating the outer rim 56 of blow head 26. The blow head 26 thus virtually closes aperture 28 with a tight annular fit between ledge 54 and the lower annular blow head rim surface 58 to prevent the escape of any core material therethrough.

Blow head 26 is provided with a large number of apertures 60 through which core material 61, from a source (not shown) to which the blow head is attached, is forcibly introduced through aperture 28 into the interior of the core box assembly, flowing around the blade patterns 12 until the void in the lower core box part is completely and solidly filled with core material. One or more vents 62 are provided in the upper part 24 of the box opposite the trailing ends 16 of the blades to allow entrapped air to escape during blowing in front of the core material being deposited.

Although the opposed concave surface 34 and convex surface 50 of the core box parts which engage the blade patterns 12 under pressure are ground and machined as carefully as possible to accurately match the curvatures of the blade patterns surfaces to the core box surfaces, it will be virtually impossible to accomplish a sufficiently close sealing fit between these surfaces so that, when core material is being blown into the core box, to avoid air being pushed by the core material under the blade patterns and into the adjoining passages between the blade patterns, to become trapped as air pockets adjacent to the blade patterns. This will provide a core with highly porous surfaces, which will show up as protrusions or pits on a bladed wheel cast with such porous core. Any such pits have to be removed from the cast wheel by hand grinding and filing, which, is a tedious and costly process.

Therefore, the present invention preferably provides for an air tight seal to be established and maintained between the adjoining surfaces of the blade patterns and core box to avoid mold material separation and prevent air pockets being formed in the core. This is effectively accomplished by coating the concave inner edge 18 and convex outer edge 17 of the blade patterns 12 with a suitable resilient sealing compound, such as the silicone rubber compound commercially known as "Silastic," which can be applied as a fluid and will harden in a short while after application into a solid uniform thickness rubber-like coating 64. The thickness of sealing coating 64 is shown exaggerated in FIGURES 2 and 3 for illustration, and it is usually of about film thickness. In some embodiments the sealing coatings 64 may be applied to the core box surfaces, or to both the core box and blade pattern surfaces. Thus, when the core box parts are clamped together with the blade patterns 12 between them, the rubber-like seal 64 will be compressed into tight engagement with the adjoining surfaces to effectively prevent any air or core material from being blown under the blades, and the air is forced to escape through the vents 62.

Another novel feature of the invention is that the blade patterns are provided at the junction of convex surface 17 with ends 14 and 16 as shown in FIGURE 2, and along the edges of convex surface 17 as shown in FIGURE 3, with radius fillets 66 so that the formation of sharp corners between these circumferential edges of the blade patterns and the adjacent surfaces of the core box parts is eliminated to prevent any voids from being formed around the edges, thus eliminating a source of constant trouble in bladed core making prior to the present invention. These voids formed around the edges had to be filled in later on in the finished core. The fillet structure 66 around the edges of the blade patterns serve furthermore the purpose of producing a core with no sharp edges around the blade contour openings. Thus, when used in casting integral bladed wheels, a smooth radius between the blades and the integral shroud members will be produced which is obviously of advantage in regard to the fluid flow in the assembled hydrodynamic wheel, preventing turbulence being set up along the corners between the blades and shrouds.

As above explained fillet structure 66 preferably extends all around the edge of the convex surface 17 of the blade patterns adjacent the outer shroud contour.

A fillet 67 may also be provided all around the concave surface 18 adjacent the inner shroud contour. In this case fillet 67 will be integral with the upper mold part 24 as illustrated in FIGURE 3 to allow removal of the blade patterns 12 from the core box assembly. As shown in FIGURE 6, due to outer fillet 66 a rounded edge 69 will be thus formed all around the outer larger opening of the molded blade aperture in the one-piece core 68, and similar rounded edges contoured like fillet structure 67 will be formed around the inner smaller openings of molded blade apertures 70.

After the blade patterns 12 have been mounted in proper position within the core box assembly 20, with a suitable parting agent has been applied to both the blade patterns and inner surfaces of the core box, the core box assembly is closed by head 26 and core material, such as resin bonded sand, or any known kind of powdered plaster material suitable for core making, is then blown or forced into the cavity of the core box through openings 60 and forced in between and around the master blades. This material is prevented from flowing between the blades and the adjoining core box surfaces due to the sealing coating 64 at these locations. The cavity of the box is thus completely filled with densely compressed core material. Then the blower head 26 is removed and the core assembly within the box is cured, as by a suitable baking or heat treating step. The sealing compound 64, especially the preferred silicone compound which is temperature resistant up to 500° F. is of such composition as to withstand the high temperatures necessary for baking and solidifying in the case of resin bonded mold material, without losing its sealing quality so that the baking process will not adversely affect the seal. After the core has been properly cured and becomes a homogeneous one-piece unit, the upper core box part 24 is removed and the now hard and self-supporting core ring 68 is taken out of the lower part 22 of the box with the blade patterns 12 still in the core.

The finished core ring 68 is then turned upside down for blade removal. This position of the core is shown in FIGURE 6, where retraction of the blade patterns 12 is illustrated. This is accomplished by vibration accompanied by extracting the blade in a direction as indicated by the direction of the arrows in FIGURE 6, which brings the blade pattern clean out of the blade apertures 70 in the core. In this step, the rounded edges due to the blade fillet arrangements will greatly facilitate the removal of the blade patterns from the core.

Once all of the blade patterns have been removed core ring 68 is ready to be used in the casting of bladed wheels for hydrodynamic devices and will produce excellent bladed wheels with consistent accuracy and maximum number of exact reproductions along with an increased efficiency due to closer control. The core box assembly and blade patterns may be reused to make additional identical one-piece cores.

Thus better solid cast bladed wheels may be produced with the aid of the one-piece core made in accord with the method of the present invention, having precise blading and accuracy at considerably less cost than methods formerly used.

The present invention may be embodied in other specific forms without departing from the spirit and essential characteristics thereof. Therefore, the present embodiment is to be considered in all respects as illustrative only and not restrictive, the scope of the invention being indicated by the appended claims rather than by the foregoing description.

What is claimed and desired to be secured by Letters Patent is:

1. The method of making an integral one-piece core for casting bladed wheels of complex blade shape comprising the steps of fixedly mounting a spaced series of shaped individual rigid blade patterns in an annular row within a core box cavity with the inner and outer surfaces of said blade patterns in full surface fluidtight sealing engagement with corresponding interior surfaces on said core box, blowing fluent core material into said cavity where it is distributed around the sides of said blade patterns and fills the cavity, solidifying the core material in said cavity to form a self-supporting annulus, and removing said blade patterns laterally through one side of said annulus.

2. The method of making an integral one-piece core for casting bladed wheels of complex blade shape comprising the steps of clamping a spaced series of shaped individual rigid blade patterns in an annular row within a cavity between separable core box parts with the inner and outer surfaces of said blade patterns in full surface fluidtight sealing engagement with corresponding surfaces on said core box parts, blowing fluent core material into the core box to fill said cavity around the sides of said blade patterns, solidifying the core material in said cavity to form a self-supporting annulus, and removing said blade patterns laterally through one side of said annulus.

3. Apparatus for making a one-piece core for casting bladed wheels of complex blade shape comprising separable core box parts enclosing a cavity, means in said cavity for mounting a spaced series of shaped rigid blade patterns in an annular row between the core box parts with the inner and outer surfaces of said blade patterns in full surface engagement with corresponding surfaces on said core box parts, means for blowing fluent core material into said cavity to entirely fill said cavity around the sides of said blade patterns, and means at said surfaces forming a fluidtight seal preventing any of said blown material from entering the spaces between said surfaces.

4. A core box assembly for making a one piece mold comprising a lower part having an upwardly open cavity, an upper part separably seated on said lower part, means for mounting an annular circumferentially spaced series of similar blade patterns in said cavity with outer and inner surfaces of said blade patterns tightly engaged with respective similarly shaped adjoining annular surfaces on the core box parts, a discharge head mounted upon said upper part having means for blowing mold material in fluent condition into the interior of said cavity in solidly compressed condition around the exposed surfaces of said blade patterns, and means at said surfaces forming a fluidtight seal preventing any of said blown material from entering the spaces between said surfaces.

5. In the core box assembly defined in claim 4, said upper core box being annular and seated tightly on said lower core box part.

6. In the core box assembly defined in claim 4, said discharge head being detachably secured to said upper core box part.

7. In the core box assembly defined in claim 4, said core box cavity and said blade patterns having cooperating projections and detents for locating all of said blade patterns in predetermined spaced relation.

8. In the core box assembly defined in claim 4, said means forming said fluidtight seal comprising means providing layers of relatively compressible sealing material at the surface engagement areas of said blade patterns and said core box parts.

9. In the core box assembly defined in claim 8, said sealing material being a rubber-like coating of temperature resistant material.

10. In the core box assembly defined in claim 9, said sealing material being a spreadable silicone adapted to harden as a coating and resistant to mold baking temperatures up to about 500° F.

11. In the core box assembly defined in claim 4, said blade patterns being larger at convex outer surfaces and being formed around said convex outer surfaces with fillets for providing rounded outer edge blade mold apertures in the finished mold.

12. In the core box assembly defined in claim 4, said core box part adjacent the smaller inner end of the blade patterns being formed with fillets around said smaller ends for providing rounded inner edge blade mold apertures in the finished mold.

13. In the core box assembly defined in claim 4, vents extending from said cavity adjacent the ends of said blade patterns through said upper part.

References Cited by the Examiner

UNITED STATES PATENTS

| | | | |
|---|---|---|---|
| 508,399 | 11/1893 | Belding | 22—158 |
| 972,473 | 10/1910 | Rusbridger | 22—158 |
| 1,303,430 | 5/1919 | Washburn et al. | 22—158 |
| 2,607,968 | 8/1952 | Peterson | 22—10 |
| 2,702,418 | 2/1955 | Miner | 22—13 |
| 2,887,744 | 5/1959 | Halliday | 22—53 |
| 2,933,785 | 4/1960 | Hansberg | 2—10 |
| 3,206,807 | 9/1965 | Hoffman et al. | 22—13 |

FOREIGN PATENTS 531,014  10/1956  Canada.

J. SPENCER OVERHOLSER, *Primary Examiner.*

MARCUS U. LYONS, *Examiner.*